United States Patent [19]

Lee

[11] Patent Number: 5,138,771
[45] Date of Patent: Aug. 18, 1992

[54] THREE DIMENSIONAL HOMOLOGOUS SURVEYING INSTRUMENT

[76] Inventor: Chiu-Shan Lee, No. 133-2, Lane 163, San Ro Road, Sec. 4, San Chung City, Taipei Hsien, Taipei, Taiwan

[21] Appl. No.: 440,809

[22] Filed: Nov. 24, 1989

[51] Int. Cl.$^5$ .............................................. G01C 9/16
[52] U.S. Cl. ....................................... 33/395; 33/273; 33/397; 33/1 LE; 33/414
[58] Field of Search ................. 33/365, 391, 395, 397, 33/351–354, 283, 285, 272, 273, 339.1 LE, 413, 414, 390

[56] References Cited

U.S. PATENT DOCUMENTS

| | | | |
|---|---|---|---|
| 807,382 | 12/1905 | Hogan | 33/273 |
| 2,384,586 | 9/1945 | Allgeo | 33/397 |

Primary Examiner—Harry N. Haroian

[57] ABSTRACT

A three-dimensional homologous surveying instrument includes a base with a spherical cover mounted thereon for receiving therein a shell holder, an intermediate spherical shell and an inner spherical shell with respective zero references set in a homologous relationship with each other. The inner spherical shell rotates within the intermediate spherical shell on a first axis serving as a dynamic X-axis. The intermediate spherical shell rotates in the shell holder on a second axis perpendicularly intersecting the first axis and thus serves as a dynamic Y-axis. The cover is positioned in the base to serve as the Z-axis. Longitudinal and latitudinal scaling on the cover matches longitudinal and latitudinal scaling on the intermediate and inner shells, resulting in a three-dimensional, completely homologous surveying instrument.

10 Claims, 5 Drawing Sheets

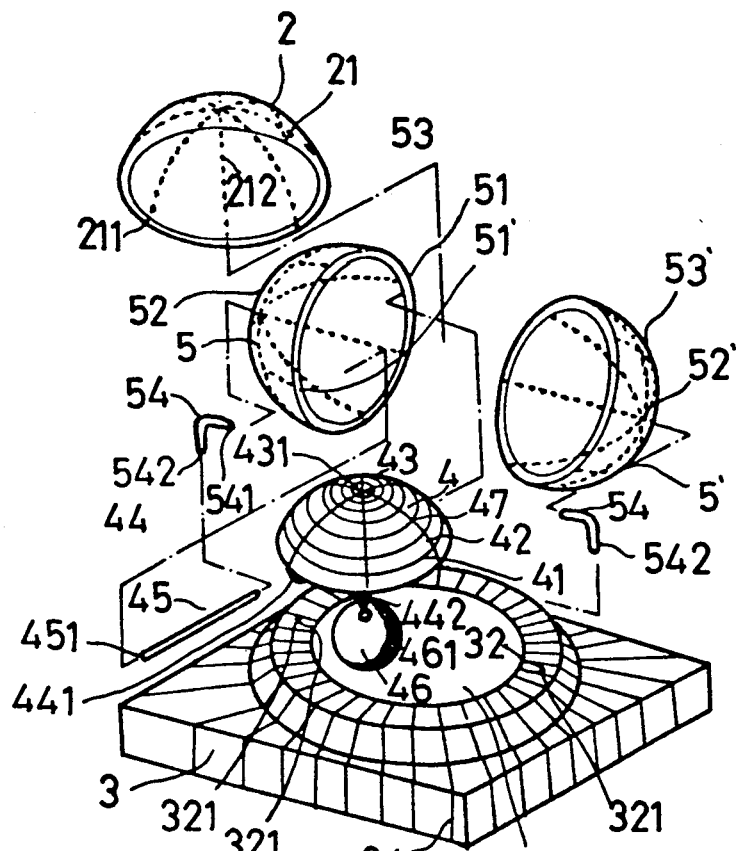
FIG.4
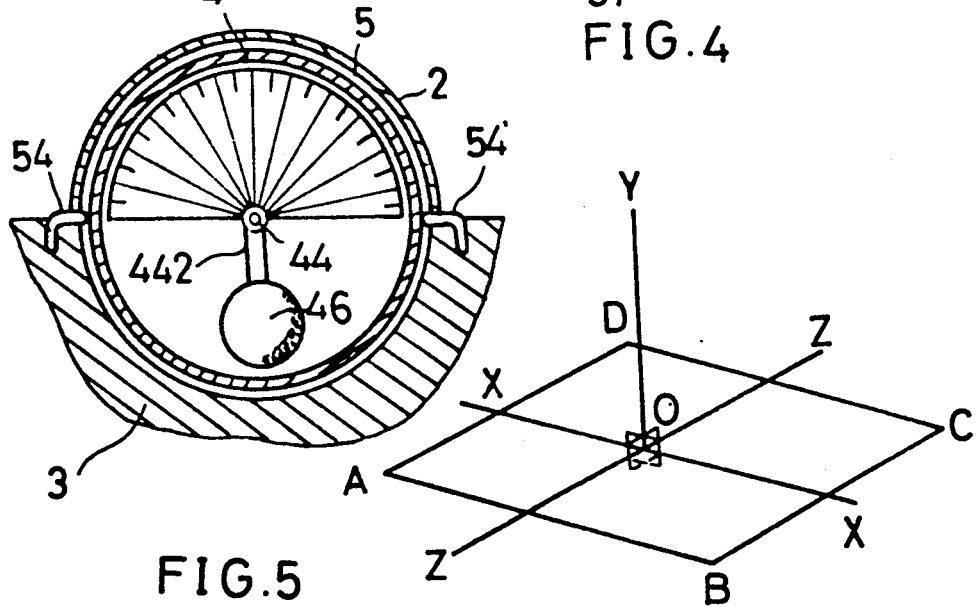
FIG.5
FIG.6

THREE DIMENSIONAL HOMOLOGOUS SURVEYING INSTRUMENT

BACKGROUND OF THE INVENTION

Conventional testing apparatus and precision instrument generally make use of one or several long or short glass tubes positioned on a and filled, with liquid containing air bubbles, the air bubbles seeking the highest point in the tubes for horizontal surveying. However, due to the nature of liquid and low sensitivity of air bubbles, accurate precision can not be obtained. The liquid used is easily affected by weather, which also causes enlargement of the air bubbles, and the low precision of glass tubes as a is likewise a serious drawback. The use of these instruments usually involves pouring water into plastic hoses to serve as references for engineering constructions. Sometimes these plastic hoses are produced in an uneven thickness, resulting in error due to different levels of still water. Also conventional, in traditional testing instruments, is the use of pendulums for vertical surveying. The pendulum is moved by hand or by another force, and then is released in order to determine and minimize the distance between the pendulum and a target. However, it takes the pendulum time to come to a stand still and when it does, the handing line hardly ever gets close enough to the target to be acceptable without repeating the measurement, making the process troublesome and resulting in reading errors as well as time wasted and imprecision. All of these instruments and those disclosed in U.S. Pat. Nos. 1,298,484, 1,345,098, 1,381,844, 1,399,423, 1,652,023, 2,384,586, 2,385,424, 2,677,193, 2,681,783; UK Pat. Nos. 136856; Japan Pat. Nos. 155808 etc., are generally for one-dimension surveys, and each requires subjective judgment, i.e., they utilize a spherical shell or indicator to rotate on an X-axis or Y-axis for reading of angles through the X and/or Y-axis, but they can not indicate the angles through three-dimensional rotation, in order to obtain a true angle measurement. In a one-dimensional survey, there is always a dead corner at which the location can not be accurately read out.

SUMMARY OF THE INVENTION

The present invention relates to a three-dimensional homologous surveying instrument in which a weight which is free from the effect of magnetic fields is fixedly mounted on two spherical shells, permitting the two spherical shells to respectively rotate on two vertically intersected axes in a cover for showing the dynamic status or X-axis and Y-axis respectively. The zero reference of the inner spherical shell is set at homo-step with the intermediate spherical shell and the cover for easy alignment of the longitude and latitude scaling on the cover with the longitude and latitude scaling or lines on the intermediate or inner spherical shell. Through the homo-step effect of the zero reference, the X-axis or Y-axis of the inner spherical shell maintains the same reference coordinates as the X-axis or Y-axis of the intermediate spherical shell, the references containing internal dynamic functions of each of the X, Y and Z axes of a Cartesian coordinate system. The cover as the same X axes or Y-axes as the inner spherical shell and the intermediate spherical shell and is set to indicate the Z-axis, permitting reading of angles within 360°. Thus, the Z-axis of the spherical cover contains external functions of X, Y and Z.

BRIEF DESCRIPTION OF THE DRAWINGS

FIG. 4 is a perspective view of the intermediate spherical shell of the embodiment of FIG. 1;

FIG. 5 is a perspective view of the inner spherical shell of the embodiment of FIG. 1;

FIG. 6 is a side sectional view of the embodiment of FIG. 1 when it is positioned at an angle of forward-backward inclination 5° from horizontal line;

Figure 1:
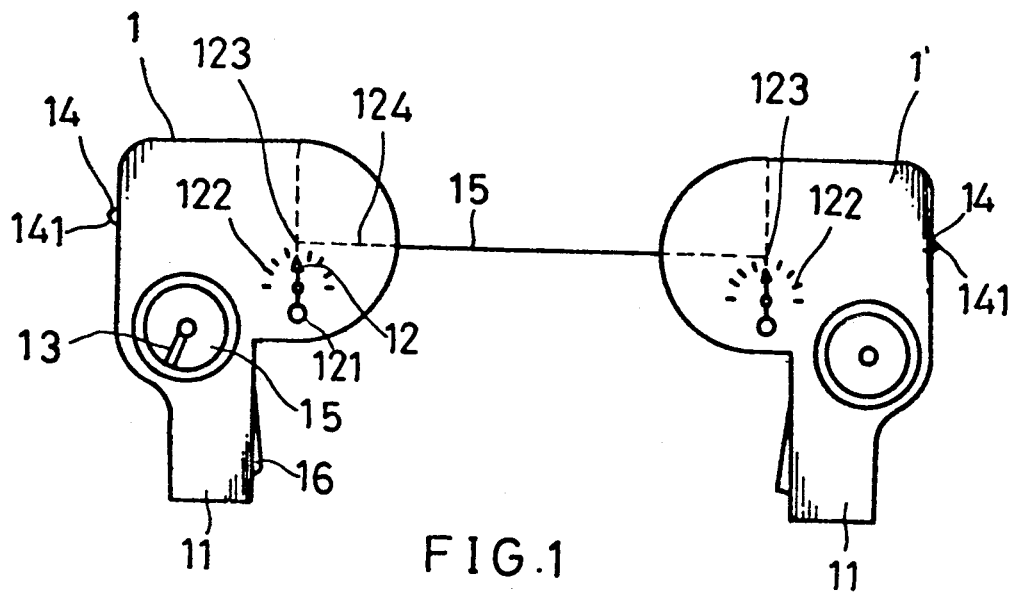
FIG. 1 is an exploded perspective view of a 3-three dimensional homologous surveying instrument embodying the present invention.

DETAILED DESCRIPTION OF THE PREFERRED EMBODIMENTS:

Referring to FIGS. 1 through 5, two hemispherical shells (101) and (102) are connected together to form an inner spherical shell. The bottom hemispherical shell (102) comprises a unitary circular convex portion (1021) upstanding from the inner lower surface of shell (102) and defining therein a recess (1022) for setting therein a pendulum (1023). The pendulum (1023) is secured in the recess (1022) of the circular convex portion (1021) to cause the center of gravity of the inner spherical shell (101, 102) to be located at its bottom center by a screw (1024) which extends through a hole (1025) in the circular convex portion (1021) hole (1021) communicates with the recess (1022). The inner spherical shell (101, 102) is marked with latitude and longitude lines (1018), and a zero reference (1019) at the highest point of the vertical axis through the center of gravity, and comprises two opposite through-holes (1026) and (1026). A pair of positioning pins (1027) and (1027) are respectively inserted into the two opposite positioning holes (1026) and (1026) at each end of shell (101,102). The other ends of the two positioning pins (1027) and (1027) are respectively inserted into two opposite positioning holes (1047) and (1047) made on an intermediate spherical shell, which is comprised of an upper hemi-spherical shell (103) and a bottom hemi-spherical shell (104). Thus, the inner spherical shell (101, 102) is positioned inside the intermediate spherical shell (103, 104) to rotate therein. The intermediate spherical shell (103, 104) is marked with latitude and longitude scaling (1038) and a zero reference line (1039). The bottom hemi-spherical shell (104) comprises a circular convex portion (1042) upstanding from the inner bottom of shell (104) and defining therein a hole (1041) for insertion therein of a heavy screw (1044) onto which a heavy nut (1043) is threaded, the nut (1043) and the screw (1044) causing the center of gravity of the intermediate spherical shell (103, 104) to be located at its bottom center nut and the screw which centralize the center of gravity of the intermediate spherical shell and the pendulum which centralizes the center of gravity of the inner spherical shell are free from the effect of magnetic field. The intermediate spherical shell (103, 104) further comprises an additional two oppositely located positioning holes (1046) and (1046') for insertion therein of two positioning pins (1045) and (1045') respectively, which two positioning pins (1045) and (1045') have the other end respectively inserted into two opposite positioning holes (1051) and (1052) of a ring-shaped shell holder (105), permitting swinging of the intermediate spherical shell (103, 104) relative to the ring-shaped shell holder (105). The ring-shaped shell holder (105) further comprises another two opposite positioning holes (1053) and (1054) for insertion therein of two positioning elements (1055) and (1055') to position the ring-shaped shell holder (15) on a spherical cover (106) and a base (107). In the present embodiment, the axis which passes through the holes (1053) and (1054) is perpendicular to the axis which passes through the holes (1051) and (1052). The base (107) includes an opening (1071) in the center having two opposite notches (1072) made thereon. After insertion through the spherical cover (106) into the ring-shaped shell holder (105), the two opposite positioning elements (1055) and (1055') are respectively mounted on the two opposite notches (1072) of the base (107) permitting swinging of the spherical cover (106) and the ring-shaped shell holder (105) on the base (107). The spherical cover (106) is marked with a zero reference (1069), latitude and longitude scaling (1068), and scaling for reading of angles of slopes. The base (107) has extending lines at various angles to ease surveying and drawing, and a compass (108).

Figure 2:
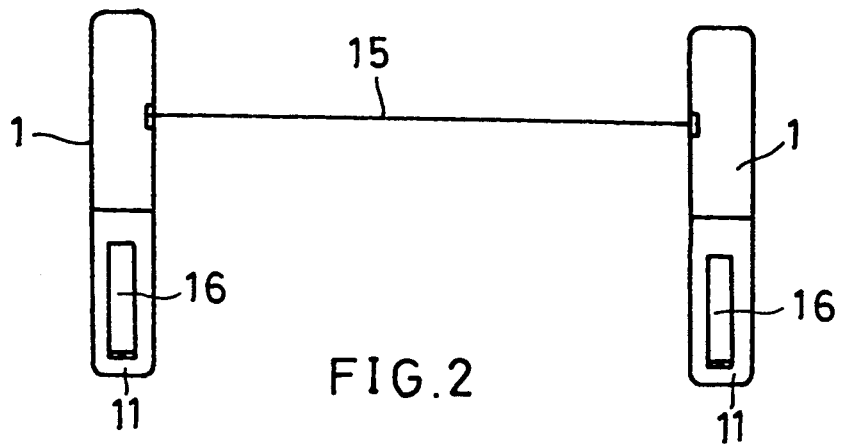
FIG. 2 is a top sectional view of the embodiment of FIG. 1.
Figure 3:
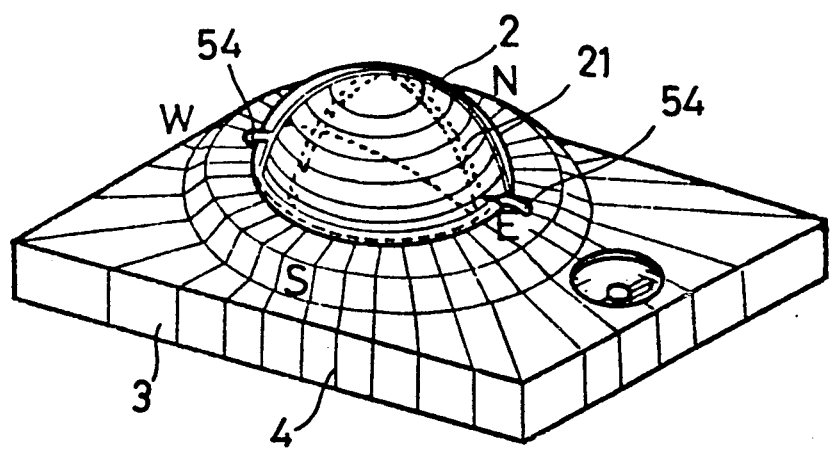
FIG. 3 is a perspective view of the cover of the embodiment of FIG. 1.

Please refer to the sectional top view of FIG. 2. The inner spherical shell (101, 102), the intermediate spherical shell (103, 104), the ring-shaped shell holder (105), and the spherical cover (106) are respectively positioned at an angle of 90° relative to each other, and a center of gravity centralized at the bottom center of the respective spheres, which, they are permitted to rotate on the X-axis, the Y-axis and the Z-axis respectively. Therefore, a 3-dimension reading of angle of slopes can be made from the spherical cover (106) and the base (107) through an axial track which passes through the positioning pins (1027) and (1027') or the positioning pins (1045) and (1045').

As described above, the inner spherical shell (101, 102) is positioned to rotate in the intermediate spherical shell (103, 104), the intermediate spherical shell (103, 104) is positioned to rotate in the ring-shaped shell holder (105), and the ring-shaped shell holder (105) is supported by the two positioning elements (1055) and (1055') on the spherical cover (106). Thus, a gyroscopic device is formed for three dimensional surveying through X-axis, Y-axis and Z-axis concomitantly.

Through axial positioning, the inner spherical shell (101, 102) and the intermediate spherical shell (103, 104) are respectively positioned at an angle of 90° relative to each other, i.e. both spherical shells are permitted to rotate on an X-axis and a Y-axis respectively. Because both spherical shells are marked with latitude and longitude lines or scaling (1018) and (1038) and comprise a zero reference (1019) or (1039) each at the top, the zero reference of the X-axis is homo-step with the zero reference of Y-axis, and the latitude and longitude lines (1018) are homo-step with the latitude and longitude scaling (1038) under horizontal status. Through the homologous effect of the zero references, the X-axis or Y-axis of the spherical shell (101, 102) maintains the same reference coordinate system as the X-axis or Y-axis of the spherical shell (103, 104), which reference system contains internal dynamic functions of X, Y and Z. Further, the spherical cover (106) has the same origin as the X-axes or Y-axes of the spherical shell (101, 102) and the spherical shell (103, 104) and is marked with a zero reference (1069), latitude and longitude scaling (1068), and scaling for reading of angles of slopes. The cover (106) is then set to indicate the Z-axis permitting reading of angles within 360° through axial axial track. Thus, the Z-axis of the spherical cover (106) contains external functions of X, Y and Z.

As described above, the inner spherical shell (101, 102) is positioned to rotate in the intermediate spherical shell (103, 104), the intermediate spherical shell (103, 104) is positioned to rotate in the ring-shaped shell holder (105). As an alternate form, the shell holder (105) may be made in hemi-spherical shape and positioned to rotate in the cover (106). The number of ring-shaped shell holders (105) or hemi-spherical shell holders and the number of positioning pins (1045) can be relatively increased as required. The requirement is to permit the inner spherical shell (101, 102) and intermediate spherical shell (103, 104) to rotate respectively, by means of gravitational effect, for dynamic display of the X-axis and the Y-axis with the zero references set in a homologous relationship with each other, such that checking and angular surveying through the X-axis of the cover (106) can be accurately and precisely made.

Figure 8:
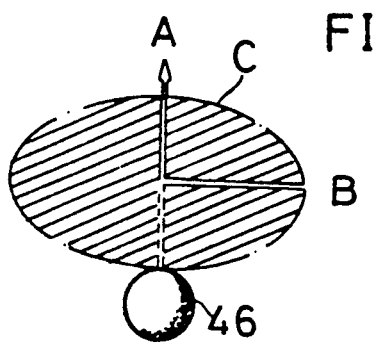
FIG. 8 illustrates that the base is positioned at a horizontal position.

Referring to FIG. 8, the spherical cover (106), the intermediate spherical shell (103, 104) and the inner spherical shell (101, 102) are under a horizontal status, the latitude and longitude scaling (1068), (1038) and (1018) are disposed at relative locations. The base (107) is thus at a multi-angular vertical and horizontal homologous relationship for reading a target through X, Y and Z axes at points a, b and c on the spherical cover (106). Because the X-axis of the spherical cover (106) is on the horizontal surface of the X-axes and Y-axes of the intermediate spherical shell (103, 104) and the inner spherical shell (101, 102), if the positioning pins (1027) and (1045) are biased, the scaling through the X-axis of the spherical cover (106) can not be aligned therewith, and the failure can then be immediately checked out.

The latitude and longitude lines or latitude and longitude scaling and the zero reference lines marked on the inner spherical shell (101, 102), the intermediate spherical shell (103, 104) and the spherical cover (106) can be replaced by any marks or patterns. Through the alignment of the marks or patterns of the spherical cover with the inner and intermediate spherical shells, it can be immediately judged if an object is at a horizontal status.

When the inner spherical shell (101, 102), the intermediate spherical shell (103, 104) and the spherical cover (106) are for X, Y, Z-axes display through 360° relative to the axial track which passes through two opposite positioning points, precision X, Y, Z angles through the reference plan can be viewed from the Z-axis of the spherical cover (106) through the intermediate spherical shell (103, 104) and the inner spherical shell (101, 102) which pivot on the X and Y-axes.

As an alternative form, either one of the inner spherical shell (101, 102) and the intermediate spherical shell (103, 104) may be a ring-shaped shell holder or hemispherical shell and only one spherical shell which has a weighted bottom center is left and positioned in a ring-shaped shell holder (105) or a plurality of ring-shaped shell holders (105) to incorporate with a spherical cover (106), wherein the spherical shell can rotate on a plurality of positioning pins (1045) in a plurality of ring-shaped shell holders (105) for showing the motion of the X, Y, and Z axes of the spherical cover (106) which can rotate through 360° on its axial track. Thus, the scaling on the Z-axis of the spherical cover (106) can be aligned with the scaling on the reference plane of the spherical shell therein. Further, the spherical cover (106) can be a wire-net globe which incorporates the spherical cover (106) for surveying, and the zero reference can be a compass. In general, the zero reference of the spherical shell or the compass which serves as the reference for the spherical shell is operated through positioning changes and contains the motion of the X and Y axes, together with the spherical cover, permit reading of angles through axes Z, Y and X. More particularly, the Z-axis of the spherical shell can be used to check the zero reference at any angle through its axial track so as to make it easier to read the angles.

Figure 7:
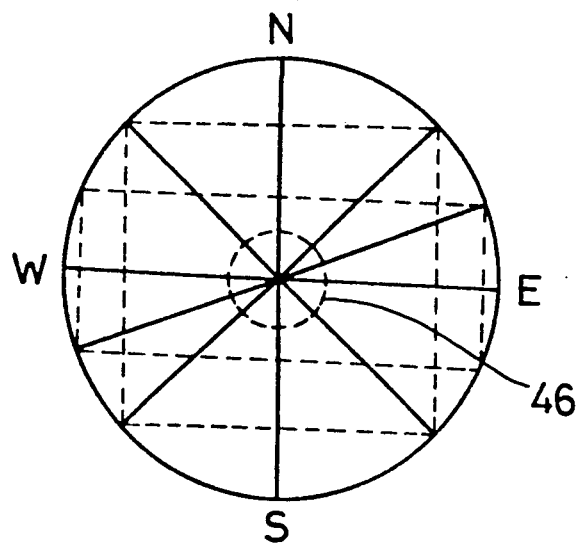
FIG. 7 is a side sectional view of the embodiment of FIG. 1 when it is positioned at an angle of right-left inclination 5° from horizontal line.
Figure 9:
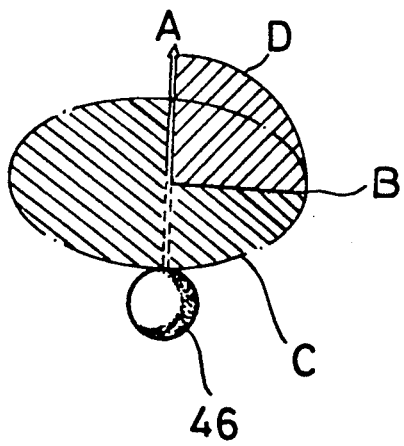
FIG. 9 illustrates that the base is positioned at a vertical position.
Figure 10:
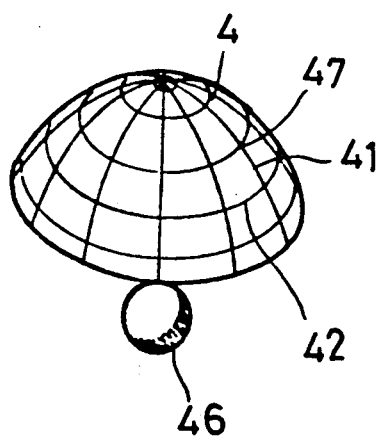
FIG. 10 is a perspective assembly view of the embodiment of FIG. 1.

Referring to FIG. 6, if the base (107) is positioned at an angle of forward-backward inclination 5° from the horizontal line, the angle of 5° is displayed on the spherical cover (106) through the Z-axis, and the angles of the X, Y and Z-axes are visible when the zero reference lines of the X or Y-axes of the intermediate spherical shell (103, 104) and the inner spherical shell (101, 102) are aligned. FIG. 7 illustrates an angular display when the base (107) is positioned at an angle of right-left inclination 5° from the horizontal line. Referring to FIG. 8, when the marks of the inner spherical shell (101, 102), the intermediate spherical shell (103, 104) and the spherical cover (106) are all aligned, it indicates that the base (107) is positioned at a horizontal point on the X-axis, Y-axis and Z-axis. Therefore, when the present invention is used in an airplane, the angular position of the airplane relative to X, Y and Z-axes can be clearly checked. FIG. 9 illustrates the application of the present invention for vertical surveying. It can be simply attached to the side wall of an object to read the angles through X-axis, Y-axis and Z-axis simultaneously, without the use of a traditional suspension pendulum. FIG. 10 illustrates the use of the present invention together with a compass for azimuth surveying. The present invention can also be matched with a range finder, or a computer software program and calculator, for application in field of engineering, medical science, research, etc.

Figures 11, 12:
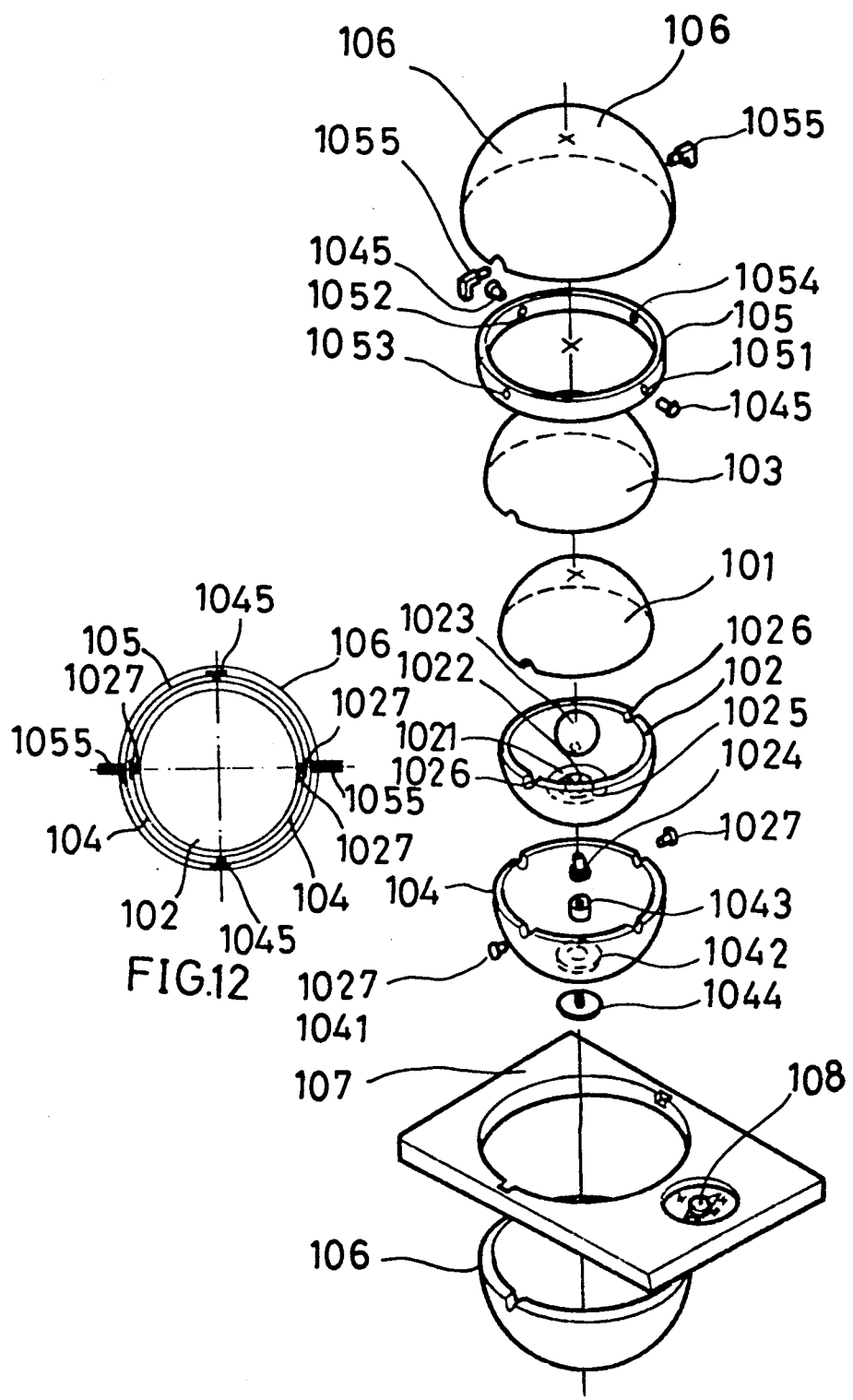
FIG. 11 is a top sectional view of the present invention wherein several positioning pins and ring-shaped shell holders are used.
FIG. 12 is a perspective fragmentary view of another three-dimensional homologous surveying instrument constructed according to the present invention.
Figure 13:
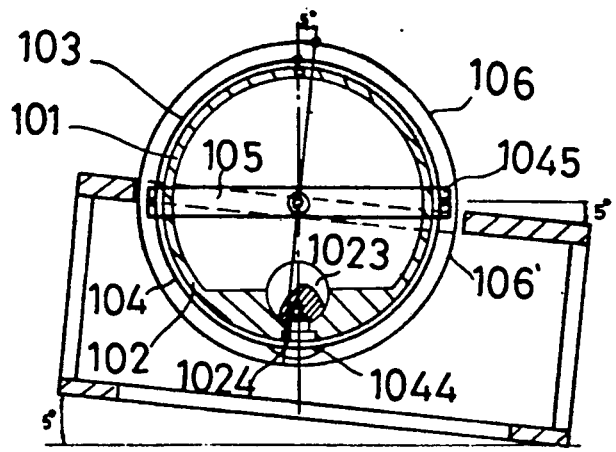
FIG. 13 is a sectional assembly view of the embodiment of FIG. 12.

FIGS. 12 and 13 illustrate another embodiment of a surveying instrument constructed according to the present invention. A cover (6) is positioned on the base (3) with a hemi-spheroid (4) and a hemi-spherical shell (5) positioned therein. Longitude lines (41) and latitude lines (42) are marked on the surface of the hemi-spheroid (4). A tip (431) is made at the pyramid (43) of the hemi-spheriod (4) at the base of the scale. An axial sleeve (44) is provided under the arc surface of the hollow hemi-spheroid (4) passing through the center of a circle. A hole (441) is made on the axial sleeve (44) into which an axial rod (45) is passed. The tips (451) and (451') of the axial rod (45) are respectively inserted into holes (51) and (51') inside the hemi-spherical shell (5) so that the axial rod (45) passes through the center of the spherical shell (5). Thus, the hemi-spherical shell (5) is connected to another hemi-spherical shell (5') to form a sphere. The less the resistance of the contact surface between tips (451) and (451') and holes (51) and (51') of the hemi-spherical shells (5) and (5'), the higher the precision. A rod (442) is positioned at the center of the axial sleeve (44), which can be screwed into a hole (461) of the pendulum (46). Scales (53) and (53') and holes (52) and (52') are respectively made on the surface of the hemi-spherical shells (5) and (5'). Holes (52) and (52') have to be perpendicular to holes (51) and (51') and should pass through the center of the hemi-spherical shells (5) and (5') so as to fix tips (451) and (451') to racks (54) and (54') respectively. Racks (54) and (54') are L-shaped. The bottom ends (542) and (542') of the racks (54) and (54') are respectively inserted into the positioning holes (321) and (321) of the notches (32) and (32') of the base (3) so that the hemi-spheroid (4) can show any angle within 360°. A round hole (31) is made on the base (3) to provide clearance for the spherical shell (5, 5'). Extending lines (34) in various angles are also made on the base (3) to ease surveying and drawing. A scale (61) is made on the surface of the cover (6). This scale corresponds to the scales (53) and (53') on the hemi-spherical shells (5) and (5') and the longitude lines (41) and latitude lines (42) on the hemi-spheroid (4) so that when the cover (6) is fixed onto the base (3), the pendulum (46) will, due to the effect of gravity, a prompt the indicator to to show either the vertical or horizontal inclination of the target. As described above, the hemi-spheroid (4) contains a 3-dimension reference line. Through the effect of the pendulum (46) affected by gravitation, the hemi-spheriod (4) can rotate in the spherical shell (5, 5') through an angle within 360° relative to the base (3), and the spherical shell (5, 5') can rotate through an angle of 360° with respect to another axial direction relative to the base (3), i.e. the hemi-spheriod (4) rotates on the X-axis and the spherical shell (5, 5') rotates on the Y-axis. Therefore, vertical and horizontal conditions of X-axis and Y-axis can be viewed through the cover (6). Because the cover (6) is marked with a longitude and latitude scale, the instrument can be simultaneously used for the X, Y, Z axes of a 3-dimension survey.

Figure 14:
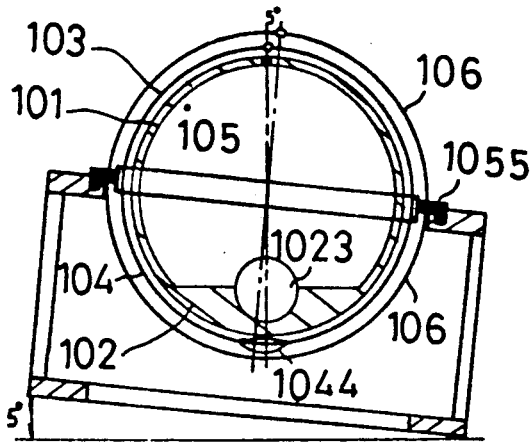
FIG. 14 is a schematic drawing illustrating the application of the present invention an ink horn apparatus.
Figure 15:
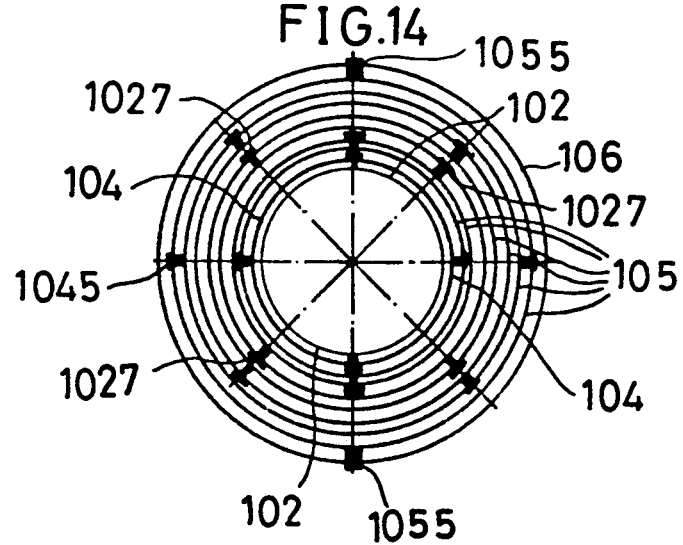
FIG. 15 is another schematic drawing illustrating the application of the present invention to an ink horn apparatus.

Referring to FIGS. 14 and 15, therein illustrated is an application of the present invention in an ink cup for making markings for one-dimensional surveying. A handle (21) is made on the cover (2) of a conventional ink horn. A surveying instrument of the present invention is mounted on the ink horn at a proper location with the 3-dimension scale (22) exposed outside for easy reading of angles. A vertical line (221) and a horizontal line (222) are respectively marked on the cover (2) of the ink horn to match with the three-dimensional scale (22). A convex tip (24) is made in line with the horizontal line (222). A rolling handle (23) is provided to roll the thread (27) which is connected to another ink horn (2'). A control button (16) is made on each ink horn to automatically rolling up the thread (27). During measurement, the thread (27) is accurately aimed at the horizontal line (222), the ink horns (2) and (2') are moved outward with the convex tips (24) of the ink horns (2) and (2') aligned when the 3-dimension scale (22) indicates a zero reading. Thus, a precise reference line can be marked out through the thread (27).

I claim:

1. A three-dimensional homologous surveying instrument, comprising:
- an inner spherical shell including a unitary circular convex portion fixed to an inner lower surface of said inner spherical shell, said circular convex portion including means defining a recess therein for positioning a pendulum, said inner spherical shell further including means for firmly securing the pendulum to the circular convex portion, and means defining two diametrically opposite positioning holes located through said inner spherical shell, wherein said pendulum places the center of gravity of said inner spherical shell adjacent said inner lower surface, said inner spherical shell further including latitudinal and longitudinal scaling on an outer surface of said inner spherical shell and a zero reference located on the outer surface of the inner spherical shell at a point diametrically opposite the pendulum;
- an intermediate spherical shell including a circular convex portion fixed to a lower inner surface of said intermediate spherical shell, said circular convex portion including means defining therein a hole for insertion therein of a screw for securing a nut, said nut and said screw placing the center of gravity of said intermediate spherical shell adjacent said lower inner surface of said intermediate spherical shell, said intermediate spherical shell further including latitudinal and longitudinal scaling on its outer wall surface and a zero reference located on the outer wall surface of the intermediate spherical shell at a point diametrically opposite the nut;
- a shell holder;
- a cover marked with a zero reference, latitudinal and longitudinal scaling, and scaling for reading of angles;
- a base having a central opening for setting said cover therein, and extending lines marked thereon at various angles to facilitate surveying and drawing;
- means including two oppositely located positioning pins for positioning said inner spherical shell to rotate within said intermediate spherical shell and thereby serve as a dynamic X-axis;
- means including two oppositely located positioning pins for positioning said intermediate spherical shell to rotate within said shell holder about an axis perpendicular to the axis of said inner spherical shell and thereby serve as a dynamic Y-axis;
- means for fixing said shell holder within said cover; and
- means for positioning said cover in the central opening of said base to indicate a Z-axis perpendicular to said X and Y axis.

2. A three-dimensional homologous surveying instrument as claimed in claim 1, wherein said shell holder is at least partially spherical, and further including an additional shell holder and additional positioning pins, positioning of the Z-axis of said cover being independent of X, Y, and Z reference planes and the reading of angles.

3. A three-dimensional homologous surveying instrument as claimed in claim 1, wherein the relative positioning of said shell holder, intermediate spherical shell, and inner spherical shell are relatively changed by the effect of gravitation on said pendulum, permitting three-dimensional surveying in any direction.

4. A three-dimensional homologous surveying instrument as claimed in claim 1, 2, or 3, wherein said shell holder and said positioning pins are fixed in a manner permitting rotation of said inner spherical shell in said intermediate spherical shell through the effect of gravitation on said pendulum and nut, and permitting rotation of said intermediate spherical shell, said shell holder and said cover such that X axis, Y axis and Z axis positions for a three-dimensional survey can be read through said cover.

5. A three-dimensional homologous surveying instrument as claimed in claim 1 further comprising longitudinal and latitudinal scaling on said cover corresponding to said longitudinal and latitudinal scaling on said intermediate spherical shell and said longitudinal and latitudinal scaling on said inner spherical shell such that the axis X, Y and Z of said inner spherical shell are homologous with those of said intermediate shell and said cover, and the position of the instrument can be checked from any two points through the scaling on said cover.

6. A three-dimensional homologous surveying instrument as claimed in claim 1, arranged such that deviation of either one of said inner or intermediate spherical shells may be checked out when the longitudinal and latitudinal lines for scaling cannot be aligned with said cover concomitantly.

7. A three-dimensional homologous surveying instrument, comprising:
- an inner spherical shell including a unitary circular convex portion fixed to an inner lower surface of said inner spherical shell, said circular convex portion including means defining a recess therein for positioning a pendulum, said inner spherical shell further including means for firmly securing the pendulum to the circular convex portion, and means defining two diametrically opposite positioning holes located through said inner spherical shell, wherein said pendulum places the center of gravity of said inner spherical shell adjacent said inner lower surface, said inner spherical shell further including patterns marked on an outer surface thereof and a zero reference located on the outer surface of said inner spherical shell at a point located diametrically opposite the pendulum;
- an intermediate spherical shell including a circular convex portion fixed to a lower inner surface of said intermediate spherical shell, said circular convex portion including means defining therein a hole for insertion therein of a screw for securing a nut, said nut and said screw placing the center of gravity of said intermediate spherical shell adjacent said lower inner surface of said intermediate spherical shell, said intermediate spherical shell further including patterns on its outer wall surface and a zero reference located on the outer wall surface of the intermediate spherical shell at a point diametrically opposite the nut;
- a shell holder;
- a cover marked with a zero reference, patterns, and scaling for reading of angles;

a base having a central opening for setting said cover therein, and extending lines marked thereon at various angles to facilitate surveying and drawing;

means including two oppositely located positioning pins for positioning said inner spherical shell to rotate within said intermediate spherical shell and thereby serve as a dynamic X-axis;

means including two oppositely located positioning pins for positioning said intermediate spherical shell to rotate within said shell holder about an axis perpendicular to the axis of said inner spherical shell and thereby serve as a dynamic Y-axis;

means for fixing said shell holder within said cover; and means for positioning said cover in the central opening of said base to indicate a Z-axis perpendicular to said X and Y axis.

8. A three-dimensional homologous surveying instrument as claimed in claim 7, further comprising a compass mounted on said base with an index surface constantly disposed upwardly for azimuth surveying.

9. A three-dimensional homologous surveying instrument comprising a spherical shell including a pendulum fixedly mounted on an inner lower surface of the spherical shell, means for positioning the spherical shell to rotate in a shell holder for display of dynamic X and Y axes, and means for identifying zero references of a plane which includes said X and Y axes when said X and Y axes are in a static state, said shell holder being positioned in a cover mounted on a base, said cover serving as a Z axis for angular positioning surveying, wherein said zero reference is a compass.

10. A three-dimensional homologous surveying instrument as claimed in claim 1, further comprising a fixed spherical shell positioned in said cover and marked with longitudinal and latitudinal lines for checking alignment of the longitudinal and latitudinal lines of said inner spherical shell with said intermediate spherical shell and said cover through a plurality of angles.

* * * * *